W. SOGGS.
Clover-Separators.

No. 203,788. Patented May 14, 1878.

Attest:
R. N. Dyer
L. W. Seely

Inventor:
William Soggs
by Geo. W. Dyer & Co.
attys.

UNITED STATES PATENT OFFICE.

WILLIAM SOGGS, OF LYONS, NEW YORK.

IMPROVEMENT IN CLOVER-SEPARATORS.

Specification forming part of Letters Patent No. 203,788, dated May 14, 1878; application filed February 19, 1878.

*To all whom it may concern:*

Be it known that I, WILLIAM SOGGS, of Lyons, in the county of Wayne and State of New York, have invented a new and useful Improvement in Separating Attachment for Clover-Hulling Machines; and I do hereby declare that the following is a full and exact description of the same, reference being had to the accompanying drawings, and to the letters of reference marked thereon.

My invention relates to a separating attachment designed to be hung to the side of a clover-mill and vibrated in any ordinary way, adapted to receive the heads, stems, and seeds from the mill, and such chaff as has not been previously blown away, and to separate the seeds and chaff from the heads and stems and other refuse, discharging the stems and heads and returning the seeds and chaff to the mill to be winnowed; and my invention consists, first, in the peculiar construction of the sieve and the solid bottom below it; and, further, in the combination, construction, and arrangement of the various parts of the attachment, as fully hereinafter explained.

Figure 1:
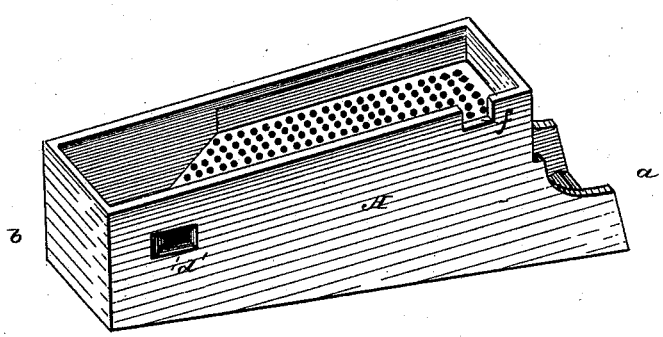
Figure 2:
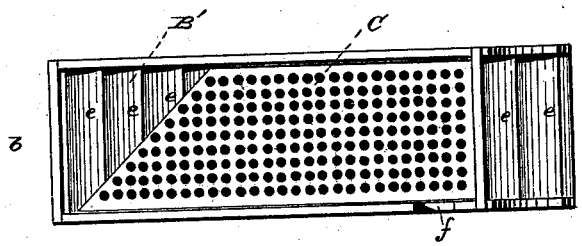
Figure 3:
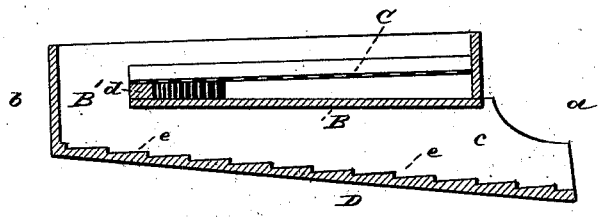

In the drawings, Figure 1 is a separate view of the attachment; Fig. 2, a top view; and Fig. 3, a central longitudinal section of the same.

Like letters of reference denote corresponding parts in all three figures.

A is the case of the device, which is hung in any suitable manner on the side of a clover-mill, and is vibrated in any of the well-known ways. The case may either have an open or closed top. It is closed at the end $b$, and at the opposite and deeper end $a$ is open from the bottom upward about half-way, and has its bottom and the lower portion of its sides extended beyond the rest of the case to form the refuse-discharge $c$. A solid and imperforate bottom, B, is secured in the shell A, extending from the end $a$ of the shell, at a point just above the opening $c$, to near the opposite end $b$. The end of this bottom nearest the end $b$ of the case is cut off obliquely, so that one side of the bottom approaches nearer than the other to the end of the case, leaving a triangular opening, B′, leading down into the lower part of the case. Along the edge of the oblique end of the bottom B is secured a bar, $d$, and in the side of the case A is formed an opening, $d'$, for delivering the seed and chaff to a suitable elevator, such opening being at the extreme forward angle of the bottom B. Above the solid bottom B, within the case A, is situated a perforated metallic sieve, C, which is secured to the top of the bar $d$ and to the sides of the case. This sieve is inclined, as is also the bottom just below it, from the end $a$ toward the end $b$ of the case, and terminates in an oblique end similar to such bottom, the said sieve being perforated throughout its entire length and close up to the bar $d$, so as to waste no screening-surface. The bottom D of the case is inclined in the opposite direction from the bottom B and screen C, and is extended beyond the end of the case at the opening $c$, as before mentioned. This inclined bottom D is solid and imperforate, and has cut in its upper surface a series of steps, $e$, which assist in the rapid discharge of the heads, stems, and refuse.

The upper edge of the side of the case, near the end $a$, is cut away, as shown at $f$, to receive the end of the trough or spout which conveys the material from the clover-mill to my separating attachment.

In operation, the heads, stems, seeds, and chaff will be fed from the clover-mill onto the sieve C at the point $f$, and by the vibration of the case and the inclination of the sieve the material will be worked toward the end $b$ of the case, the seeds and chaff falling through the perforations and traveling on the solid bottom B to the oblique bar $d$ and the opening $d'$, while the heads and stems will fall over the oblique end of the screen onto the stepped bottom, and will be discharged at the opening $c$.

The seeds and chaff are taken from the opening $d'$ and carried by an elevator back into the mill, where the chaff is winnowed from the seeds.

It is necessary to perforate the sieve C throughout its length and close up to the oblique bar $d$, for the reason that more screening-surface is required on one side of the sieve than on the other, the material in my attachment being fed to the sieve on its longest side at the opening $f$, and consequently more of the material passes down that side of the sieve, and the other and shorter side has less work to perform.

What I claim as my invention, and desire to secure by Letters Patent, is—

1. In a separating attachment to clover-mills, the combination, with the solid bottom B, having an oblique end, and a bar, d, at its end, which forms one side of a discharge-trough, of the sieve C, placed above such bottom, and having an oblique end secured to the said bar, the said sieve being perforated throughout its entire length, and receiving the material to be separated on its longest side, substantially as described and shown.

2. In an attachment to a clover-hulling machine, adapted to separate the stems and heads from the seeds and chaff preparatory to being winnowed, the combination of an inclined sieve, C, perforated throughout its entire length, secured to and placed above a solid bottom, B, which is inclined in the same direction, the lower part of both sieve and bottom having similar oblique ends, closed by a bar, d, and a stepped lower bottom, D, inclined in an opposite direction from the sieve C, and solid bottom B, seed-discharge opening $d'$, and refuse-exit $c$, whereby the stems and heads are separated from the seeds and chaff, substantially as described.

This specification signed and witnessed this 17th day of December, 1877.

WILLIAM SOGGS.

Witnesses:
 CHARLES E. IRELAND,
 LYMUN L. DICKERSON.